(12) United States Patent
Ponnaluri et al.

(10) Patent No.: US 7,450,405 B2
(45) Date of Patent: Nov. 11, 2008

(54) DC/AC CONVERTER WITH DAMPENED LCL FILTER DISTORTIONS

(75) Inventors: Srinivas Ponnaluri, Untersiggenthal (CH); Leonardo Serpa, Zürich (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 11/878,418

(22) Filed: Jul. 24, 2007

(65) Prior Publication Data

US 2008/0007974 A1    Jan. 10, 2008

Related U.S. Application Data

(63) Continuation of application No. PCT/CH2005/000292, filed on May 24, 2005.

(60) Provisional application No. 60/646,504, filed on Jan. 25, 2005.

(51) Int. Cl.
*H02M 1/12* (2006.01)

(52) U.S. Cl. .......................... 363/40; 363/98

(58) Field of Classification Search ................ 363/40, 363/41, 98, 132
See application file for complete search history.

(56) References Cited

U.S. PATENT DOCUMENTS 5,942,876 A    8/1999    Maekawa

| | | | |
|---|---|---|---|
| 6,154,379 A * | 11/2000 | Okita | 363/40 |
| 6,950,321 B2 * | 9/2005 | Stancu et al. | 363/40 |
| 7,190,143 B2 * | 3/2007 | Wei et al. | 318/606 |
| 2006/0164873 A1 * | 7/2006 | Colombi et al. | 363/41 |
| 2007/0070660 A1 * | 3/2007 | Tallam | 363/44 |
| 2007/0263418 A1 * | 11/2007 | Ponnaluri et al. | 363/39 |

OTHER PUBLICATIONS

W. Koczara et al., "Clean reactive power compensator", vol. 1 of 4, Conf. 28, Nov. 5, 2002, pp. 2951-2956.

M. Lindgren et al., "Control of a voltage-source converter connected to the grid through an LCL-filter-application to active filtering", vol. 1, May 17, 1998, pp. 229-235.

E.J. Bueno et al., "Current control of voltage source converters connectred to the grid through an LCL-filter", vol. 1, Jun. 20, 2004, pp. 68-73.

International Search Report dated Sep. 20, 2005.

PCT/IB/326 and PCT/IB/338 the references identified in these documents were filed in the first Information Disclosure Statement filed Jul. 24, 2007.

* cited by examiner

*Primary Examiner*—Jeffrey L Sterrett
(74) *Attorney, Agent, or Firm*—Buchanan Ingersoll & Rooney PC (57) ABSTRACT

A method is disclosed for operating a converter circuit, with the converter circuit having a converter unit with a plurality of drivable power semiconductor switches and an LCL filter connected to each phase connection of the converter unit, in which the drivable power semiconductor switches are driven by means of a drive signal which is formed from a hysteresis power value, from a hysteresis wattless-component value and from a selected flux sector. An apparatus for carrying out the method is also disclosed.

16 Claims, 3 Drawing Sheets

DC/AC CONVERTER WITH DAMPENED LCL FILTER DISTORTIONS

RELATED APPLICATIONS

This application claims priority under 35 U.S.C. §119(e) to U.S. Provisional Application 60/646,504 filed in US on Jan. 25, 2005, and as a continuation application under 35 U.S.C. §120 to PCT/CH2005/000292 filed as an International Application on May 24, 2005, designating the U.S., the entire contents of which are hereby incorporated by reference in their entireties.

TECHNICAL FIELD

The invention relates to the field of power electronics, based on a method for operating a converter circuit, and an apparatus for carrying out the method.

BACKGROUND INFORMATION

Conventional converter circuits have a converter unit with a multiplicity of drivable power semiconductor switches, which are connected in a known manner in order to switch at least two switching voltage levels. An LCL filter is connected to each phase connection of the converter unit. A capacitive energy store is also connected to the converter unit and is normally formed by one or more capacitors. An apparatus is provided for operating the converter circuit, which has a control device for producing a hysteresis power value, a hysteresis wattless component value and a selected flux sector, which control device is connected to the drivable power semiconductor switches via a drive circuit in order to form a drive signal from the hysteresis power value, the hysteresis wattless component value and the selected flux sector. The power semiconductor switches are therefore driven by means of the drive signal.

Figure 3:
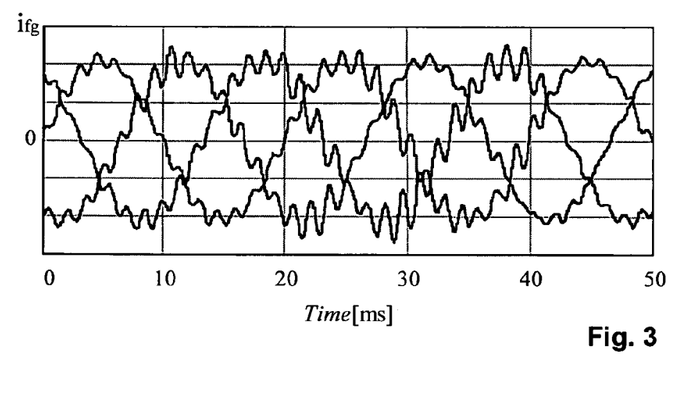
FIG. 3 shows a conventional waveform of the filter output currents.

A converter circuit as mentioned above is subject to the problem that the LCL filters can cause permanent distortion, that is to say undesirable oscillations, in the filter output currents and filter output voltages as a result of resonant oscillations of the LCL filters, as shown in the normal waveform of filter output currents shown in FIG. 3. In an electrical AC voltage power supply system, which is typically connected to the filter outputs, or when an electrical load is connected to the filter outputs, such distortion can lead to damage or even to destruction, and is therefore very highly undesirable.

SUMMARY

One object of the invention is therefore to specify a method for operating a converter circuit, by means of which it is possible to actively damp distortion, caused by LCL filters connected to the converter circuit, in the filter output currents and filter output voltages. A further object of the invention is to specify an apparatus by means of which the method can be carried out in a particularly simple manner.

The converter circuit has a converter unit with a multiplicity of drivable power semiconductor switches, and an LCL filter connected to each phase connection of the converter unit. In the method according to the invention for operating the converter circuit, the drivable power semiconductor switches are now driven by means of a drive signal formed from a hysteresis power value, from a hysteresis wattless component value and from a selected flux sector. According to the invention, the hysteresis power value is formed from a difference power value by means of a first hysteresis regulator and the difference power value is formed from the subtraction of an estimated power value and of a damping power value from a reference power value, with the damping power value being formed from a sum, weighted by a variable damping factor, of a multiplication of the $\alpha$ component of the space vector transformation of filter capacitance currents of the LCL filters by an $\alpha$ component of the space vector transformation of phase connection currents and a multiplication of a $\beta$ component of the space vector transformation of filter capacitance currents of the LCL filters by a $\beta$ component of the space vector transformation of phase connection currents. Furthermore, the hysteresis wattless component value is formed from a difference wattless component value by means of a second hysteresis regulator, and the difference wattless component value is formed from the subtraction of an estimated wattless component value and of a damping wattless component value from a reference wattless component value with the damping wattless component value being formed from a difference, weighted by the variable damping factor of a multiplication of the $\beta$ component of the space vector transformation of the filter capacitance currents of the LCL filters by the $\alpha$ component of the space vector transformation of phase connection currents and a multiplication of the $\alpha$ component of the space vector transformation of filter capacitance currents of the LCL filters by the $\beta$ component of the space vector transformation of the phase connection currents.

The damping power value and the damping wattless component value advantageously make it possible to actively damp distortion, that is to say undesirable harmonics, in the filter output currents and filter output voltages, so that distortion is greatly reduced and, in the ideal case is very largely suppressed. A further advantage of the method according to the invention is that there is no need to connect any discrete, space-consuming, complex and therefore expensive damping resistor to the respective phase connection, in order to allow undesirable distortion to be effectively damped.

The apparatus according to the invention for carrying out the method for operating the converter circuit has a control device which is used to produce a hysteresis power value, a hysteresis wattless component value and a selected flux sector and is connected via a drive circuit to the drivable power semiconductor switches in order to form a drive signal.

According to the invention, the control device has a first calculation unit for forming the hysteresis power value, the hysteresis wattless component value and the selected flux sector, with the first calculation unit having a first hysteresis regulator for forming the hysteresis power value from a difference power value, a second hysteresis regulator for forming the hysteresis wattless component value from a difference wattless component value and a vector allocator for forming the selected flux sector. Furthermore, the control device has a first adder for forming the difference power value from the subtraction of an estimated power value and of a damping power value from a reference power value and a second adder for forming the difference wattless component value from the subtraction of an estimated wattless component value and of a damping wattless component value from a reference wattless component value. Moreover, the control device has a second calculation unit for forming the damping power value and the damping wattless component value, with the damping power value being formed from a sum, weighted by a variable damping factor, of a multiplication of an $\alpha$ component of the space vector transformation of filter capacitance currents of the LCL filters by an $\alpha$ component of the space vector transformation of phase connection currents, and a multiplication of a $\beta$ component of the space vector transformation of filter capacitance currents of the LCL filter by a β component of the space vector transformation of phase connection currents. Furthermore, the damping wattless component value is formed from a difference, weighted by the variable damping factor, of a multiplication of the β component of the space vector transformation of filter capacitance currents of the LCL filters by the α component of the space vector transformation of phase connection currents and a multiplication of the α component of the space vector transformation of filter capacitance currents of the LCL filters by the β component of the space vector transformation of phase connection currents.

The apparatus according to the invention for carrying out the method for operating the converter circuit can thus be produced very easily and at low cost, since the circuit complexity can be kept extremely low and, furthermore, only a small number of components are required to construct it. The method according to the invention can be carried out particularly easily by means of this apparatus.

These and further objects, advantages and features of the present invention will become clear from the following detailed description of preferred embodiments of the invention and in conjunction with the drawing.

The reference symbols used in the drawing and their meanings, are listed in summary form in the list of reference symbols. In principle, identical parts are provided with the same reference symbols in the figures. The described embodiments represent examples of the subject matter of the invention and have no restrictive effect.

DETAILED DESCRIPTION

Figure 1:
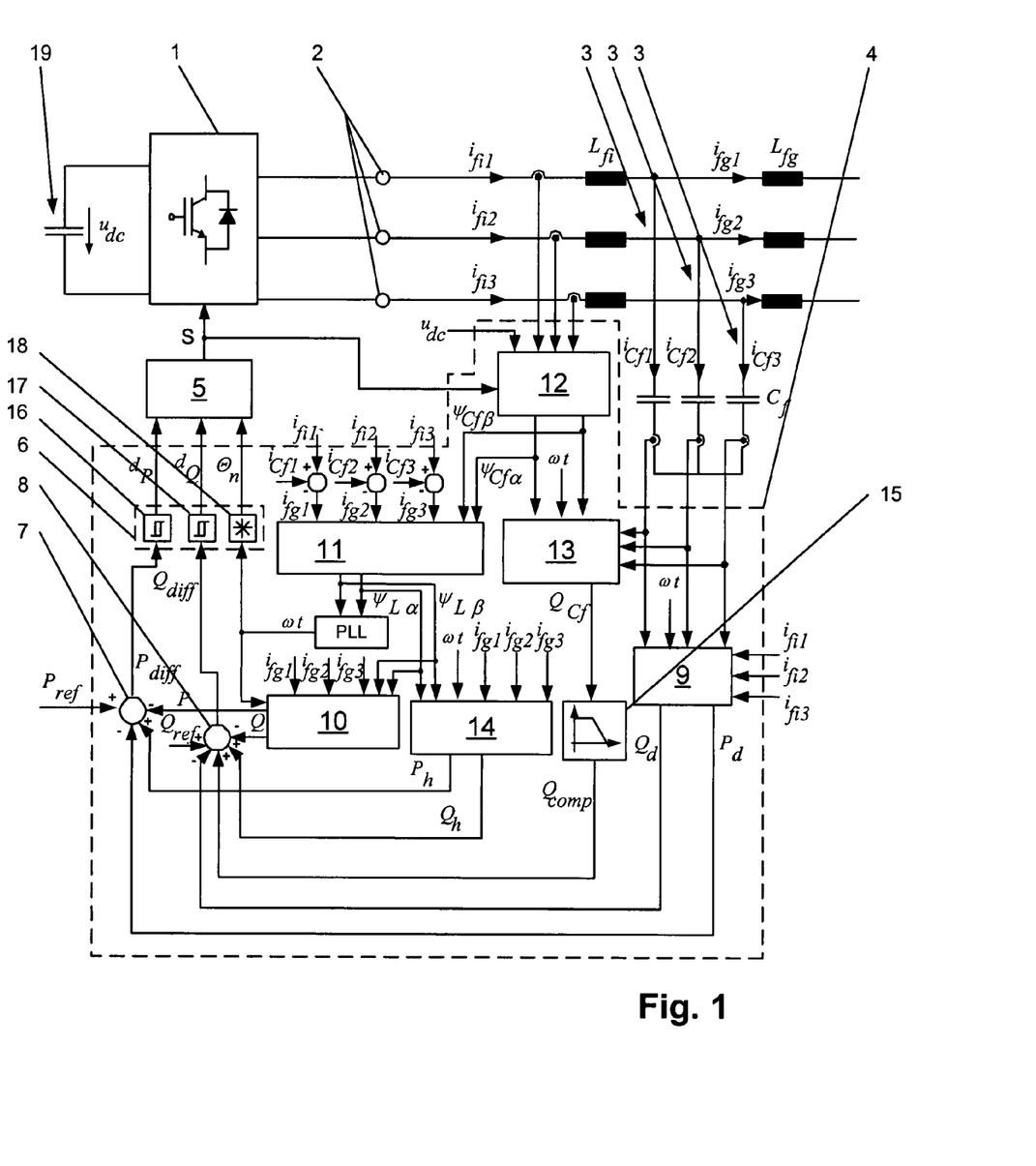
FIG. 1 shows one embodiment of an apparatus according to the invention for carrying out the method according to the invention for operating a converter circuit.

FIG. 1 shows one embodiment of an apparatus according to the invention for carrying out the method according to the invention for operating a converter circuit. As shown in FIG. 1, the converter circuit has a converter unit 1 with a multiplicity of drivable power semiconductor switches and an LCL filter 3 connected to each phase connection 2 of the converter unit 1.

Accordingly, each LCL filter 3 has a first filter inductance $L_{fi}$, a second filter inductance $L_{fg}$ and a filter capacitance $C_f$ with the first filter inductance $L_{fi}$ being connected to the associated phase connection 2 of the converter unit 1, to the second filter inductance $L_{fg}$ and to the filter capacitance $C_f$. Furthermore, the filter capacitances $C_f$ of the individual LCL filters 3 are connected to one another. By way of example, FIG. 1 shows a converter unit 1 as a three-phase unit. It should be mentioned that, in general, the converter unit 1 may be in the form of any converter unit 1 for switching $\geq 2$ switching voltage levels (multi-level converter circuit) relating to the voltage of a capacitive energy store 19 connected to the converter unit 1, in which case the capacitive energy store 19 is then formed by any desired number of capacitances, which are then connected such that they are matched to the appropriately designed partial converter circuit.

In the method according to the invention for operating the converter circuit, the drivable power semiconductor switches of the converter unit 1 are now driven by means of a drive signal S formed from a hysteresis power value $d_P$, from a hysteresis wattless component value $d_Q$ and from a selected flux sector $θ_n$. The drive signal is normally formed using a look-up table, in which hysteresis power values $d_P$, hysteresis wattless component values $d_Q$ and selected flux sectors $θ_n$ are permanently associated with corresponding drive signals S, or a modulator, which is based on pulse-width modulation. According to the invention, the hysteresis power value $d_P$ is formed from a difference power value $P_{diff}$ by means of a first hysteresis regulator 16 as shown in FIG. 1. Furthermore, the difference power value $P_{diff}$ is formed from the subtraction of an estimated power value P and a damping power value $P_d$ from a reference power value $P_{ref}$, with the damping power value $P_d$ being formed from a sum, weighted with a variable damping factor $k_d$, of a multiplication of an α component of the space vector transformation of filter capacitance currents $i_{Cfα}$ of the LCL filters 3 by an α component of the space vector transformation of phase connection currents $i_{fiα}$, and a multiplication of a β component with the space vector transformation of filter capacitance currents $i_{Cfβ}$ of the LCL filters 3 by a β component of the space vector transformation of gphase connection currents $i_{fiβ}$ as is illustrated in particular by the following formula.

$$Pd = kd \cdot (i_{Cfα} \cdot i_{fiα} + i_{Cfβ} \cdot i_{fiβ})$$

The reference power value $P_{ref}$ is freely variable and is the nominal value of the power which is intended to be produced at the output of the LCL filters 3. Furthermore, the hysteresis wattless component value $d_Q$ is formed from a difference wattless component value $Q_{diff}$ by means of a second hysteresis regulator 17 and the difference wattless component value $Q_{diff}$ is formed from the subtraction of an estimated wattless component value Q and a damping wattless component value $Q_d$ from a reference wattless component value $Q_{ref}$, with the damping wattless component value $Q_d$ being formed from a difference, weighted by the variable damping factor $k_d$, of a multiplication of the β component of the space vector transformation of filter capacitance currents $i_{Cfβ}$ of the LCL filters 3 by the α component of the space vector transformation of phase connection currents $i_{fiα}$ and a multiplication of the α component of the space vector transformation of filter capacitance currents $i_{Cfα}$ of the LCL filters 3 by the β component of the space vector transformation of phase connection currents $i_{fiβ}$ as illustrated in particular by the following formula.

$$Q_d = k_d \cdot (i_{Cfβ} \cdot i_{fiα} - i_{Cfα} \cdot i_{fiβ})$$

The reference wattless component value $Q_{ref}$ is freely variable and is the nominal value of the wattless component which is intended to be produced at the output of the LCL filters 3.

It should be mentioned that the space vector transformation is defined as follows:

$$\bar{x} = x_α + jx_β$$

where $\bar{x}$ is a complex variable, $x_α$ is the α component of the space vector transformation of the variable $\bar{x}$ and $x_β$ is the β component of the space vector transformation of the variable $\bar{x}$. All of the space vector transformations of variables mentioned above and those which will be mentioned later are produced using the formula mentioned above.

The damping power value $P_d$ and the damping wattless component value $Q_d$ can advantageously be used for active damping of distortion, that is to say undesirable oscillation, in the filter output currents $i_{fg1}$, $i_{fg2}$, $i_{fg3}$ and filter output voltages, so that this distortion is very greatly reduced and, ideally is very largely suppressed. A further advantage of the method according to the invention is that there is no need to connect any discrete space-consuming, complex and thus expensive damping resistor to the respective phase connection 2, in order to allow effective damping of the undesirable distortion.

According to FIG. 1, the apparatus according to the invention for carrying out the method according to the invention for operating a converter circuit for this purpose has a control device 4 which is used for producing the hysteresis power value $d_P$, the hysteresis wattless component value $d_Q$ and the selected flux sector $\theta_n$, and is connected to the drivable power semiconductor switches via a drive circuit 5 in order to form a drive signal S. By way of example, the drive circuit 5 has a look-up table in which hysteresis power values $d_P$, hysteresis wattless component values $d_Q$ and selected flux sectors $\theta_n$ are permanently associated with corresponding drive signal S, or a modulator which is based on pulse-width modulation. According to the invention, the control device 4 has a first calculation unit 6 for forming the hysteresis power value $d_P$, the hysteresis wattless component value $d_Q$ and the selected flux sector $\theta_n$, with the first calculation unit 6 having the first hysteresis regulator 16 for forming the hysteresis power value $d_P$ from the difference wattless component value $P_{diff}$, the second hysteresis regulator 17 for forming the hysteresis wattless component value $d_Q$ from the difference wattless component value $Q_{diff}$ and a vector allocator 18 for forming the selected flux sector $\theta_n$. Furthermore, the control device 4 has a first adder 7 for forming the difference power value $P_{diff}$ from the subtraction of the estimated power value P and of the damping power value $P_d$ from the reference power value $P_{ref}$ and a second adder 8 for forming the difference wattless component value $Q_{diff}$ from the subtraction of the estimated wattless component value Q and of the damping wattless component value $Q_d$ from the reference wattless component value $Q_{ref}$. Furthermore, the control device 4 has a second calculation unit 9 for forming the damping power value $P_d$ and the damping wattless component value $Q_d$, with the damping power value $P_d$ being formed from the sum, weighted by the variable damping factor $k_d$, of the multiplication of the α component of the space vector transformation of filter capacitance currents $i_{C f\alpha}$ of the LCL filters 3 by the α component of the space vector transformation of phase connection currents $i_{fi\alpha}$, and the multiplication of the β component of the space vector transformation of filter capacitance currents $i_{C f\beta}$ of the LCL filter 3 by the β component of the space vector transformation of phase connection currents $i_{fi\beta}$, and the damping wattless component value $Q_d$ being formed from the difference, weighted by the variable damping factor $k_d$, of the multiplication of the β component of the space vector transformation of filter capacitance currents $i_{C f\beta}$ of the LCL filters 3 by the α component of the space vector transformation of phase connection currents $i_{fi\alpha}$ and a multiplication of the α component of the space vector transformation of filter capacitance currents $i_{C f\alpha}$ of the LCL filters 3 by the β component of the space vector transformation of phase connection currents $i_{fi\beta}$. The apparatus according to the invention for carrying out the method for operating the converter circuit can accordingly be produced very easily and at low cost, since the circuit complexity can be kept extremely low and, furthermore, only a small number of components are required to construct it. The method according to the invention can therefore be carried out particularly easily by means of this apparatus.

The estimated power value P and the estimated wattless component value Q are in each case formed from an α component of the space vector transformation of filter output currents $i_{fg\alpha}$, from a β component of the space vector transformation of filter output currents $i_{fg\beta}$, from an α component of the space vector transformation of filter output fluxes $\psi_{L\alpha}$ and from a β component of the space vector transformation of filter output fluxes $\psi_{L\beta}$, as is illustrated in particular by the following formulae:

$$P = \omega \cdot (\psi_{L\alpha} \cdot i_{fg\beta} - \psi_{L\beta} \cdot i_{fg\alpha})$$

$$Q = \omega \cdot (\omega_{L\alpha} \cdot i_{fg\alpha} - \psi_{L\beta} \cdot i_{fg\beta})$$

In order to form the estimated power value P and the estimated wattless component value Q, the control device 4 as shown in FIG. 1 has a third calculation unit 10, by means of which the estimated power value P and the estimated wattless component value Q are each calculated using the appropriate formula as mentioned above.

The α component of the space vector transformation of filter output fluxes $\psi_{L\alpha}$ is formed from an α component of the space vector transformation of estimated filter capacitance fluxes $\psi_{C f\alpha}$ and from the α component of the space vector transformation of filter output currents $i_{fg\alpha}$, as illustrated in particular by the following formula:

$$\psi_{L\alpha} = \psi_{C f\alpha} - L_{fg} \cdot i_{fg\alpha}$$

Furthermore, the β component of the space vector transformation of filter output fluxes $\psi_{L\beta}$ is formed from a β component of the space vector transformation of estimated filter capacitance fluxes $\psi_{C f\beta}$ and from the β component of the space vector transformation of filter output currents $i_{fg\beta}$, as indicated in particular by the following formula:

$$\psi_{L\beta} = \psi_{C f\beta} - L_{fg} \cdot i_{fg\beta}.$$

In order to form the α component of the space vector transformation of filter output fluxes $\psi_{L\alpha}$ and the β component of the space vector transformation of filter output fluxes $\psi_{L\beta}$, the control device 4 as shown in FIG. 1 has a fourth calculation unit 11, by means of which the α component of the space vector transformation of filter output fluxes $\psi_{L\alpha}$ and the β component of the space vector transformation of filter output fluxes $\psi_{L\beta}$ are calculated, in each case using the appropriate formula as stated above.

The α component of the space vector transformation of filter output currents $i_{fg\alpha}$ is formed from the α component of the space vector transformation of phase connection currents $i_{fi\alpha}$, which is formed by space vector transformation of the phase connection currents $i_{fi1}$, $i_{fi2}$, $i_{fi3}$ as shown in FIG. 1, and from the α component of the space vector transformation of the filter capacitance currents $i_{C f\alpha}$ which is formed by space vector transformation of the filter capacitance currents $i_{C f1}$, $i_{C f2}$, $i_{C f3}$, measured as shown in FIG. 1, by addition. Furthermore, the β component of the space vector transformation of filter output currents $i_{fg\beta}$, is formed from the β component of the space vector transformation of phase connection currents $i_{fi\beta}$, which is formed by space vector transformation of the phase connection currents $i_{fi1}$, $i_{fi2}$, $i_{fi3}$ measured as shown in FIG. 1, and from the β component of the space vector transformation of the filter capacitance currents $i_{C f\beta}$ which is formed by space vector transformation of the filter capacitance currents $i_{C f1}$, $i_{C f2}$, $i_{C f3}$ measured as shown in FIG. 1, by addition. There is therefore advantageously no need to measure the filter output currents $i_{fg1}$, $i_{fg2}$, $i_{fg3}$ thus simplifying the apparatus, since no measurement sensors are required, in particular no current transformers. It should be mentioned that the space vector transformation of the measured phase connection currents $i_{fi1}$, $i_{fi2}$, $i_{fi3}$ and of the measured filter capacitance currents $i_{C f1}$, $i_{C f2}$, $i_{C f3}$ as well as the other spacevector-transformed variables is or can be carried out within an associated calculation unit 9, 10, 13, 14 or separately in a space-vector transformation unit which is provided additionally for this purpose.

The α component of the space vector transformation of estimated filter capacitance fluxes $\psi_{Cf\alpha}$ is once again formed from an instantaneous DC voltage value $u_{dc}$ of the capacitive energy store 19 connected to the converter unit 1, from the drive signal S and from the α component of the space vector transformation of phase connection currents $i_{fi\alpha}$, as indicated in particular by the following formula, with $u_{C\alpha}$ being the α component of the phase connection voltage of the converter unit 1, formed from the instantaneous DC voltage value $u_{dc}$ and from the drive signal.

$$\psi_{Cf\alpha} = \int u_{C\alpha} dt - L_{fi} \cdot i_{fi\alpha}$$

In a corresponding manner, the β component of the space vector transformation of estimated filter capacitance fluxes $\psi_{Cf\beta}$ is formed from the instantaneous DC voltage value $u_{dc}$ of the capacitive energy store 19 connected to the converter unit 1, from the drive signal S and from the β component of the space vector transformation of phase connection currents $i_{fi\beta}$, $u_{C\beta\alpha}$ being the β component of the phase connection voltage of the converter unit 1, formed from the instantaneous DC voltage value $u_{dc}$ and from the drive signal.

$$\psi_{Cf\beta} = \int u_{C\beta} dt - L_{fi} \cdot i_{fi\beta}$$

In order to form the α component of the space vector transformation of estimated filter capacitance fluxes $\psi_{Cf\alpha}$ and the β component of the space vector transformation of estimated filter capacitance fluxes $\psi_{Cf\beta}$, the control device 4 as shown in FIG. 1 has a fifth calculation unit 12, by means of which the α component of the space vector transformation of estimated filter capacitance fluxes $\psi_{Cf\alpha}$ and the β component of the space vector transformation of estimated filter capacitance fluxes $\psi_{Cf\beta}$ is in each case calculated using the appropriate formula as mentioned above.

In order to form the already mentioned difference wattless component value $Q_{diff}$, a compensation wattless component value $Q_{comp}$ is additionally added, with the compensation wattless component value $Q_{comp}$ being formed by low-pass filtering of an estimated filter capacitance wattless component value $Q_{cf}$ by means of a low-pass filter 15. This therefore advantageously avoids undesirable wattless components of the LCL filters 3, in particular of the filter capacitances $C_f$ of the LCL filters 3, being produced at the output of the LCL filters 3, thus making it possible to ensure that only a wattless component value corresponding to the selected reference wattless component value $Q_{ref}$ is produced at the output of the LCL filters 3. As shown in FIG. 1, the compensation wattless component value $Q_{comp}$ is additionally supplied to the second adder 8. Furthermore, the estimated filter capacitance wattless component value $Q_{Cf}$ is formed from the α component of the space vector transformation of the filter capacitance currents $i_{Cf\alpha}$, from the β component of the space vector transformation of the filter capacitance currents $i_{Cf\beta}$, from the α a component of the space vector transformation of the estimated filter capacitance fluxes $\psi_{Cf\alpha}$ and from the β component of the space vector transformation of the estimated filter capacitance fluxes $\psi_{Cf\beta}$ as illustrated in particular by the following formula:

$$Q_{Cf} = \psi \cdot (\psi_{Cf\alpha} \cdot i_{Cf\alpha} + \psi_{Cf\beta} \cdot i_{Cf\beta})$$

In order to form the estimated filter capacitance wattless component value $Q_{Cf}$ as shown in FIG. 1, the control device 4 has a sixth calculation unit 13, by means of which the estimated filter capacitance wattless component value $Q_{cf}$ is calculated using the abovementioned formula.

In order to form the already mentioned difference power values $P_{diff}$, at least one compensation harmonic power value $P_h$ relating to the fundamental of the filter output currents $i_{fg1}$, $i_{fg2}$, $i_{fg3}$ is additionally added. Furthermore, in order to form the already mentioned difference wattless component value $Q_{diff}$, at least one compensation harmonic wattless component value $Q_h$ relating to the fundamental of the filter output currents $i_{fg1}$, $i_{fg2}$, $i_{fg3}$ is additionally added. As shown in FIG. 1, in order to form the difference power value $P_{diff}$, the first adder 7 is additionally supplied with the compensation harmonic power value $P_h$. Furthermore, in order to form the difference wattless component value $Q_{diff}$ as shown in FIG. 1, the second adder 7 is additionally supplied with the compensation harmonic wattless component value $Q_h$. The compensation harmonic power value $P_h$ and the compensation harmonic wattless component value $Q_h$ are in each case formed from the α component of the space vector transformation of the filter output currents $i_{fg\alpha}$, from the β component of the space vector transformation of the filter output currents $i_{fg\beta}$, from the α component of the space vector transformation of the filter output fluxes $\psi_{L\alpha}$, from the β component of the space vector transformation of the filter output fluxes $\psi_{L\beta}$, and from the fundamental angle ωt relating to the fundamental of the filter output currents $i_{fg1}$, $i_{fg2}$, $i_{fg3}$. The fundamental angle ωt is provided for the calculation units 9, 10, 13, 14 and for the vector allocator 18 as shown in FIG. 1 from a phase locked loop (PLL). As shown in FIG. 1, the control device 4 has a seventh calculation unit 14 in order to form the compensation harmonic power value $P_h$ and the compensation harmonic wattless component value $Q_h$, with one embodiment of the seventh calculation unit 14 being shown in FIG. 2. The addition or application of at least one compensation harmonic power value $P_h$ in order to form the difference power value $P_{diff}$ and of at least one compensation harmonic wattless component value $Q_h$ in order to form the difference wattless component value $Q_{diff}$ advantageously results in an active reduction in the harmonics, and thus overall in a further improvement in the reduction in the harmonics.

Figure 2:
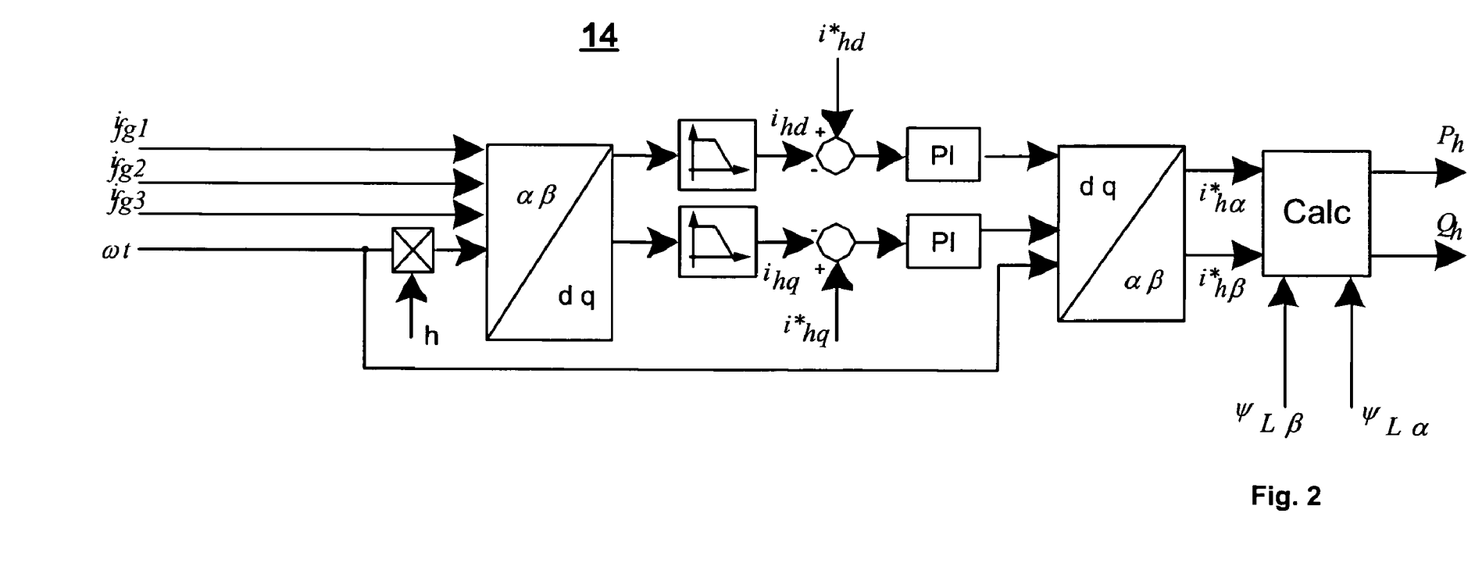
FIG. 2 shows one embodiment of a seventh calculation unit.

As shown in FIG. 2, the α component of the space vector transformation of the filter output currents $i_{fg\alpha}$ and the β component of the space vector transformation of the filter output currents $i_{fg\beta}$ is first of all formed from supplied filter output currents $i_{fg1}$, $i_{fg2}$, $i_{fg3}$ by space vector transformation. The α component of the space vector transformation of the filter output currents $i_{fg\alpha}$ and the β component of the space vector transformation of the filter output currents $i_{fg\beta}$ are then Park-Clarke-transformed, low-pass filtered and emitted as the d component and the q component of the Park-Clarke transformation of at least one desired selected harmonic of the filter output currents $i_{hd}$, $i_{hq}$ relating to the fundamental of the filter output currents $i_{fg1}$, $i_{fg2}$, $i_{fg3}$. The index h represents the hth harmonic of these variables and those mentioned in the following text, where h=1, 2, 3, . . . .

In general, the Park-Clarke transformation is defined as $$\bar{x} = (x_d + j x_q) e^{j\omega t}$$

where $\bar{x}$ is a complex variable, $x_d$ is the d component of the Park-Clarke transformation of the variable $\bar{x}$ and $x_q$ is the q component of the Park-Clarke transformation of the variable $\bar{x}$. One advantage of the Park-Clarke transformation is that not only the fundamental of the complex variable $\bar{x}$ is transformed, but also all of the harmonics of the complex variable $\bar{x}$ that occur. As shown in FIG. 2, the d component and the q component of the Park-Clarke transformation of the desired selected hth harmonic of the filter output currents $i_{hd}$, $i_{hq}$ are in each case regulated at an associated predetermined reference value $i^*_{hd}$, $i^*_{hq}$, preferably based on a proportional integral characteristic, and are then inverse-Park-Clarke transformed, thus resulting in the formation of an α component of the space vector transformation of the hth harmonic of reference filter output currents $i^*_{h\alpha}$ and a β component of the space vector transformation of the hth harmonic of reference filter output currents $i^*_{h\beta}$. Finally, the compensation harmonic power value $P_h$ and the compensation harmonic wattless component value $Q_h$ are each calculated from the α component of the space vector transformation of the hth harmonic of reference filter output currents $i^*_{h\alpha}$, the β component of the space vector transformation of the hth harmonic of reference filter output currents $i^*_{h\beta}$, the α component of the space vector transformation of the filter output fluxes $\psi_{L\alpha}$, and from the β component of the space vector transformation of the filter output fluxes $\psi_L$, as illustrated in particular by the following formulae:

$$P_h = \omega \cdot (\psi_{L\alpha} \cdot i^*_{h\beta} - \psi_{L\beta} \cdot i^*_{h\alpha})$$

$$Q_h = \omega \cdot (\psi_{L\alpha} \cdot i^*_{h\alpha} - \psi_{L\beta} \cdot i^*_{h\beta})$$

Figure 4:
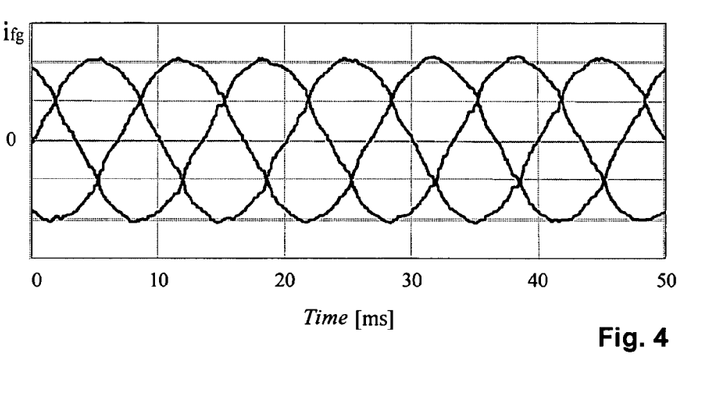
FIG. 4 shows a waveform of the filter output currents with active damping using the method according to the invention.

FIG. 3 shows a conventional waveform of the filter output currents $i_{fg1}$, $i_{fg2}$, $i_{fg3}$. In order to illustrate the method of operation of the active damping based on the method according to the invention as explained above, FIG. 4 shows a waveform of the filter output currents $i_{fg1}$, $i_{fg2}$, $i_{fg3}$, in which case undesirable oscillation in the filter output currents $i_{fg1}$, $i_{fg2}$, $i_{fg3}$ are actively damped, so that this distortion is greatly reduced. Furthermore, the additional active reduction of harmonics when using the method according to the invention, as described above, results in a further improvement in the reduction of harmonics.

All of the steps in the method according to the invention may be implemented as software, in which case this software can then be loaded in and run on a computer system, in particular using a digital signal processor. The digital delay times which occur in a system such as this, in particular for the calculations, may, for example be taken into account in a general form by addition of an additional term to the fundamental frequency ωt for the Park-Clarke transformation. Furthermore, the apparatus according to the invention, as described in detail above, can also be implemented in a computer system, in particular in a digital signal processor.

Overall, it has been possible to show that the apparatus according to the invention, in particular as shown in FIG. 1, for carrying out the method according to the invention for operating the converter circuit, can be produced very easily and at low cost, since the circuit complexity is extremely low and, furthermore, only a small number of components are required to construct it. This apparatus therefore allows the method according to the invention to be carried out particularly easily.

LIST OF REFERENCE SYMBOLS

1 Converter unit
2 Phase connection of the converter unit
3 LCL filter
4 Control device
5 Drive circuit
6 First calculation unit
7 First adder
8 Second adder
9 Second calculation unit
10 Third calculation unit
11 Fourth calculation unit
12 Fifth calculation unit
13 Sixth calculation unit
14 Seventh calculation unit
15 Low-pass filter
16 First hysteresis regulator
17 Second hysteresis regulator
18 Vector allocator

What is claimed is:

1. A method for operating a converter circuit, with the converter circuit having a converter unit with a plurality of drivable power semiconductor switches and an LCL filter connected to each phase connection of the converter unit,
   in which the drivable power semiconductor switches are driven by means of a drive signal which is formed from a hysteresis power value, from a hysteresis wattless-component value and from a selected flux sector,
   wherein the hysteresis power value is formed from a difference power value by means of a first hysteresis regulator,
   wherein the difference power value is formed from the subtraction of an estimated power value and of a damping power value from a reference power value, with the damping power value being formed from a sum, weighted by a variable damping factor, of a multiplication of an α component of the space vector transformation of filter capacitance currents ($i_{cf\alpha}$) of the LCL filters by an α component of the space vector transformation of phase connection currents ($i_{fi\beta}$) and a multiplication of a β component of the space vector transformation of filter capacitance currents ($i_{cf\beta}$) of the LCL filters by a β component of the space vector transformation of phase connection currents ($i_{fi\beta}$),
   wherein the hysteresis wattless component value is formed from a difference wattless component value by means of a second hysteresis regulator,
   wherein the difference wattless component value is formed from the subtraction of an estimated wattless component value and of a damping wattless component value from a reference wattless component value with the damping wattless component value being formed from a difference, weighted by the variable damping factor of a multiplication of the β component of the space vector transformation of filter capacitance currents ($i_{cf\beta}$) of the LCL filters by the α component of the space vector transformation of phase connection currents ($i_{fi\alpha}$) and a multiplication of the α component of the space vector transformation of filter capacitance currents ($i_{cf\alpha}$) of the LCL filters by the β component of the space vector transformation of phase connection currents ($i_{fi\beta}$).

2. The method as claimed in claim 1, wherein the estimated power value and the estimated wattless component are each formed from an α component of the space vector transformation of filter output currents ($i_{fg\alpha}$), from a β component of the space vector transformation of filter output currents ($i_{fg\beta}$), from an α component of the space vector transformation of filter output fluxes ($\psi_{L\alpha}$) and from a β component of the space vector transformation of filter output fluxes ($\psi_{L\beta}$).

3. The method as claimed in claim 2, wherein the α component of the space vector transformation of filter output fluxes ($\psi_{L\alpha}$) is formed from an α component of the space vector transformation of estimated filter capacitance fluxes (($\psi_{Cf\alpha}$) and from the α component of the space vector transformation of filter output currents ($i_{fg\alpha}$),
   and wherein the β component of the space vector transformation of filter output fluxes ($\psi_{L\beta}$) is formed from a β component of the space vector transformation of estimated filter capacitance fluxes ($\psi_{C/\beta}$) and from the $\beta$ component of the space vector transformation of filter output currents ($i_{fg\beta}$).

4. The method as claimed in claim 3, wherein the $\alpha$ component of the space vector transformation of estimated filter capacitance fluxes ($\psi_{cf\alpha}$) is formed from an instantaneous DC voltage value of a capacitive energy store connected to the converter unit, from the drive signal and from the $\alpha$ component of the space vector transformation of phase connection currents ($i_{fi\alpha}$), and wherein the $\beta$ component of the space vector transformation of estimated filter capacitance fluxes ($\psi_{C/\beta}$) is formed from the instantaneous DC voltage value ($u_{dc}$) of the capacitive energy store connected to the converter unit, from the drive signal and from the $\beta$ component of the space vector transformation of phase connection currents ($i_{fi\beta}$).

5. The method as claimed in claim 3, wherein a compensation wattless component value is additionally added in order to form the difference wattless component value, with the compensation wattless component value being formed by low-pass filtering of an estimated filter capacitance wattless component value.

6. The method as claimed in claim 5, wherein the estimated filter capacitance wattless component value is formed from the $\alpha$ component of the space vector transformation of the filter capacitance currents ($i_{Cf\alpha}$), from the $\beta$ component of the space vector transformation of the filter capacitance currents ($i_{cf\beta}$), from the $\alpha$ component of the space vector transformation of the estimated filter capacitance fluxes ($\psi_{Cf\alpha}$) and from the $\beta$ component of the space vector transformation of the estimated filter capacitance fluxes ($\psi_{C/\beta}$).

7. The method as claimed in claim 3, wherein at least one compensation harmonic power value relating to the fundamental of the filter output currents is additionally added in order to form the difference power value, and wherein at least one compensation harmonic wattless component value relating to the fundamental of the filter output currents is additionally added in order to form the difference wattless component value.

8. The method as claimed in claim 7, wherein the compensation harmonic power value and the compensation harmonic wattless component value are each formed from the $\alpha$ component of the space vector transformation of the filter output currents ($i_{fg\alpha}$), from the $\beta$ component of the space vector transformation of the filter output currents ($i_{fg\beta}$), from the $\alpha$ component of the space vector transformation of the filter output fluxes ($\psi_{L\alpha}$), and from the $\beta$ component of the space vector transformation of the filter output fluxes ($\psi_{L\beta}$), and from the fundamental angle relating to the fundamental of the filter output currents.

9. An apparatus for carrying out a method for operating a converter circuit, with the converter circuit having a converter unit with a plurality of drivable power semiconductor switches and an LCL filter connected to each phase connection of the converter unit, having a control device which is used for producing a hysteresis power value, a hysteresis wattless component value and a selected flux sector and is connected to the drivable power semiconductor switches via a drive circuit in order to form a drive signal, wherein the control device has a first calculation unit for forming the hysteresis power value, the hysteresis wattless component value and the selected flux sector, with the first calculation unit having a first hysteresis regulator for forming the hysteresis power value from a difference power value, a second hysteresis regulator for forming the hysteresis wattless component value from a difference wattless component value and a vector allocator for forming the selected flux sector, a first adder for forming the difference power value from the subtraction of an estimated power value and of a damping power value from a reference power value, a second adder for forming the difference wattless component value from the subtraction of an estimated wattless component value and of a damping wattless component value from a reference wattless component value, a second calculation unit for forming the damping power value and the damping wattless component value, with the damping power value being formed from a sum, weighted by a variable damping factor, of a multiplication of an $\alpha$ component of the space vector transformation of filter capacitance currents ($i_{cf\alpha}$) of the LCL filters by an $\alpha$ component of the space vector transformation of phase connection currents ($i_{fi\alpha}$), and a multiplication of a $\beta$ component of the space vector transformation of filter capacitance currents ($i_{C/\beta}$) of the LCL filter by a $\beta$ component of the space vector transformation of phase connection currents ($i_{fi\beta}$), and the damping wattless component value being formed from a difference, weighted by the variable damping factor, of a multiplication of the $\beta$ component of the space vector transformation of filter capacitance currents ($i_{cf\beta}$) of the LCL filters by the $\alpha$ component of the space vector transformation of phase connection currents ($i_{fi\alpha}$) and a multiplication of the $\alpha$ component of the space vector transformation of filter capacitance currents ($i_{Cf\alpha}$) of the LCL filters by the $\beta$ component of the space vector transformation of phase connection currents ($i_{fi\beta}$).

10. The apparatus as claimed in claim 9, wherein the control device has a third calculation unit for forming the estimated power value and the estimated wattless component value in each case from an $\alpha$ component of the space vector transformation of filter output currents ($i_{fg\alpha}$) from a $\beta$ component of the space vector transformation of filter output currents ($i_{fg\beta}$), from an $\alpha$ component of the space vector transformation of filter output fluxes ($\psi_{L\alpha}$) and from a $\beta$ component of the space vector transformation of filter output fluxes ($\psi_{L\beta}$).

11. The apparatus as claimed in claim 10, wherein the control device has a fourth calculation unit for forming the $\alpha$ component of the space vector transformation of filter output fluxes ($\psi_{L\alpha}$) and the $\beta$ component of the space vector transformation of filter output fluxes ($\psi_{L\beta}$), with the $\alpha$ component of the space vector transformation of filter output fluxes ($\psi_{L\alpha}$) being formed from an $\alpha$ component of the space vector transformation of estimated filter capacitance fluxes ($\psi_{Cf\alpha}$) and from the $\alpha$ component of the space vector transformation of filter output currents ($i_{fg\alpha}$), and with the $\beta$ component of the space vector transformation of filter output fluxes ($\psi_{L\beta}$) being formed from a $\beta$ component of the space vector transformation of estimated filter capacitance fluxes ($\psi_{C/\beta}$) and from the $\beta$ component of the space vector transformation of filter output currents ($i_{fg\beta}$).

12. The apparatus as claimed in claim 11, wherein the control device has a fifth calculation unit for forming the $\alpha$ component of the space vector transformation of estimated filter capacitance fluxes ($\psi_{Cf\alpha}$) and the $\beta$ component of the space vector transformation of estimated filter capacitance fluxes ($\psi_{C/\beta}$) with the $\alpha$ component of the space vector transformation of estimated filter capacitance fluxes (($\psi_{Cf\alpha}$) being formed from an instantaneous DC voltage value of a capacitive energy store connected to the converter unit, from the drive signal and from the α component of the space vector transformation of phase connection currents ($i_{fi\alpha}$), and with the β component of the space vector transformation of estimated filter capacitance fluxes ($\psi_{CF\beta}$) being formed from the instantaneous DC voltage value of the capacitive energy store connected to the converter unit from the drive signal and from the β component of the space vector transformation of phase connection currents ($i_{fi\beta}$).

13. The apparatus as claimed in claim 11, wherein the second adder is additionally supplied with a compensation wattless component value in order to form the difference wattless component value, with the compensation wattless component value being formed by low-pass filtering of an estimated filter capacitance wattless component value by means of a low-pass filter.

14. The apparatus as claimed in claim 13, wherein the control device has a sixth calculation unit for forming the estimated filter capacitance wattless component value from the α component of the space vector transformation of the filter capacitance currents ($i_{Cf\alpha}$), from the β component of the space vector transformation of the filter capacitance currents ($i_{Cf\beta}$), from the α component of the space vector transformation of the estimated filter capacitance fluxes ($\psi_{Cf\alpha}$), and from the β component of the space vector transformation of the estimated filter capacitance fluxes ($\psi_{CF\beta}$).

15. The apparatus as claimed in claim 11, wherein the first adder is additionally supplied with at least one compensation harmonic power value relating to the fundamental of the filter output currents in order to form the difference power value, and wherein the second adder is additionally supplied with at least one compensation harmonic wattless component value relating to the fundamental of the filter output currents in order to form the difference wattless component value.

16. The apparatus as claimed in claim 15, wherein the control device has a seventh calculation unit for forming the compensation harmonic power value and the compensation harmonic wattless component value in each case from the α component of the space vector transformation of the filter output currents ($i_{fg\alpha}$), from the β component of the space vector transformation of the filter output currents ($i_{fg\beta}$), from the α component of the space vector transformation of the filter output fluxes ($\psi_{L\alpha}$), from the β component of the space vector transformation of the filter output fluxes ($\psi_{L\beta}$), and from the fundamental angle relating to the fundamental of the filter output currents.

* * * * *